INVENTOR.
HAROLD SPITLER,
BY
McMorrow, Berman + Davidson
ATTORNEYS.

Aug. 1, 1950  H. SPITLER  2,517,047
LOAD-EQUALIZING TRAILER HITCH DEVICE
Filed Dec. 3, 1948  2 Sheets-Sheet 2
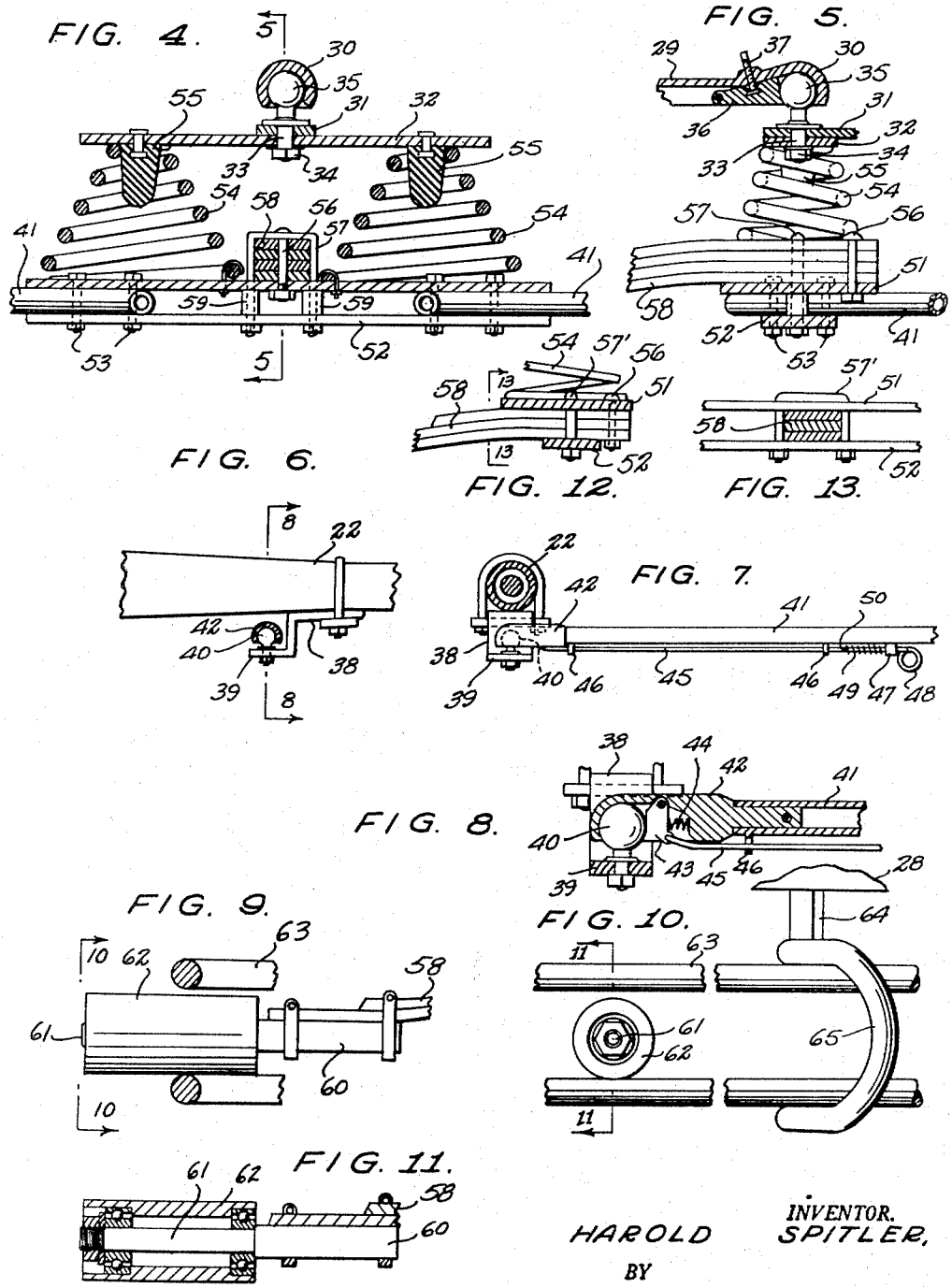
INVENTOR.
HAROLD SPITLER,
BY
McMorrow, Berman & Davidson
ATTORNEYS.

Patented Aug. 1, 1950

2,517,047

UNITED STATES PATENT OFFICE 2,517,047

LOAD-EQUALIZING TRAILER HITCH DEVICE

Harold Spitler, Arcanum, Ohio

Application December 3, 1948, Serial No. 63,325

6 Claims. (Cl. 280—33.9)

This invention relates to automobile trailer couplers, and more particularly to load-equalizing means for use in a trailer coupler device for enabling the automobile drawing the trailer to maintain a level position at all times and to enable the automobile to draw the trailer without impairment of the riding quality of the automobile.

A main object of the invention is to provide a novel and improved trailer hitch attachment for use in the hitch connection between a loaded trailer and the automobile which is to draw the trailer, said attachment being simple in construction, easy to install, and providing a cushioning action for vertical movements of the trailer relative to the automobile, whereby the riding quality of the automobile will not be substantially affected adversely by the connection of the loaded trailer thereto, even under rough and bumpy road conditions.

A further object of the invention is to provide an improved automobile trailer hitch structure, wherein the automobile will not be depressed at its rear portion by the load imposed thereon by the trailer, therefore allowing the headlight beams of the automobile to be directed in the same manner as when the trailer is not attached to the automobile, wherein road shocks experienced by the trailer will not be transmitted to the automobile, and wherein lateral whipping of the trailer when it is towed by the automobile is controlled and cushioned to a substantial extent.

Further objects and advantages of the invention will become apparent from the following description and claims, and from the accompanying drawings, wherein:

Figure 4 is an enlarged cross-sectional detail view taken on line 4—4 of Figure 2;

Figure 5 is a cross-sectional detail view taken on line 5—5 of Figure 4;

Figure 6 is an enlarged cross-sectional detail view taken on line 6—6 of Figure 2;

Figure 7 is an enlarged cross-sectional detail view taken on line 7—7 of Figure 1;

Figure 8 is an enlarged cross-sectional detail view taken on line 8—8 of Figure 6.

Figure 9 is an enlarged cross-sectional detail view taken on line 9—9 of Figure 3;

Figure 10 is a detail view taken on line 10—10 of Figure 9;

Figure 11 is a cross-sectional detail view taken on line 11—11 of Figure 10;

Figure 12 is a fragmentary cross-sectional detail view similar to the lower portion of Figure 5, but illustrating an alternative method of securing the resilient rear bearing arm of the hitch structure to the transverse fastening plates of said hitch structure;

Figure 13 is a cross-sectional detail view taken on line 13—13 of Figure 12.

Figure 1:
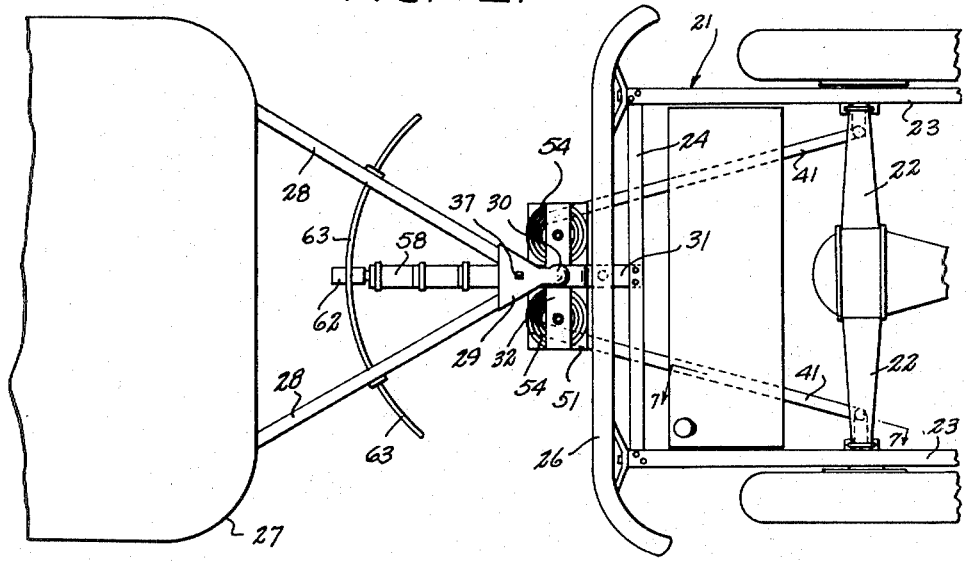
Figure 1 is a top plan view of a trailer hitch structure according to the present invention, showing the use of the hitch structure to connect a trailer to the rear portion of an automobile chassis.
Figure 2:
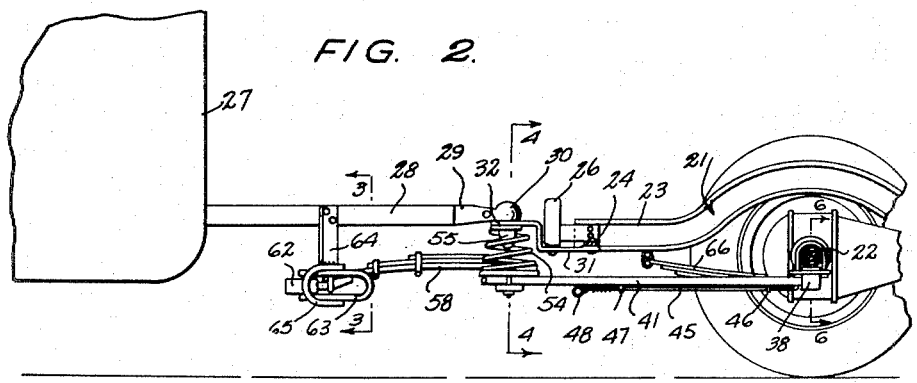
Figure 2 is a side elevational view of the structure of Figure 1, the automobile chassis being shown partly in longitudinal cross-section.

Referring to the drawings, 21 designates the chassis of an automobile, said chassis being conventional in structure and including the longitudinal frame members 23, 23 and the transverse rear frame member 24. The gasoline tank is designated at 25. Secured transversely to the end of the automobile chassis frame is the usual rear bumper 26.

Designated at 27 is a trailer provided with the converging hitch arms 28, 28 which are connected at their forward ends by the trianglar cover plate 29, said cover plate 29 being formed with a downwardly-facing ball seat 30. Secured beneath the mid portions of frame member 24 and bumper 26 is the lower arm of a rearwardly-extending Z-bracket 31. Secured transversely to the upper arm of said Z-bracket is an elongated plate member 32, said plate member being secured to the Z-bracket by a flanged stud 33 provided with a fastening nut 34. The top end of stud 33 comprises a ball element 35 which is rotatably received in the ball seat 30, as shown in Figure 4.

As shown in Figure 5, the cover plate 29 is provided with a pivoted detent member 36 which is releasably locked in rearward engagement with ball element 35 by means of a rotatable T-bolt 37 threadedly engaged with cover plate 29. The head of T-bolt 37 is received in an undercut recess in detent member 36. By rotating the T-bolt 37 a quarter-turn from the position shown in Figure 5, the head thereof may be disengaged from the undercut recess releasing detent member 36 and allowing the cover plate 29 to be lifted off the ball element 35.

Clamped to the axle housings indicated at 22, 22 are the respective depending brackets 38, said brackets each having an inwardly-directed horizontal flange 39 carrying an upstanding ball element 40. Designated at 41, 41 are respective rearwardly-converging bars, each bar being provided with a bearing cap element 42 rotatably receiving one of the ball elements 40, as shown in Figures 6, 7 and 8. The bearing cap elements 42 are provided with pivoted ball-engaging detent members 43, each being biased into engagement with the ball element 40 associated therewith by a spring 44 bearing between the detent member and the adjacent inner wall surface of the bearing cap element, as shown in Figure 8. Connected to each detent member 43 is a retractable release rod 45 slidably carried in depending apertured lugs 46 provided on the associated bar 41. The rear end of each rod 45 passes through a depending apertured lug 47 carried by the associated bar 41 and is formed with a ring 48. Encircling the rear portion of each rod 45 is a coiled spring 49 bearing between a transverse pin 50 carried by the rod, and the lug 47, whereby the rod is biased forwardly. By retracting the rod 45 against the biasing force of the springs 49 and 44, the detent member 43 associated therewith may be disengaged from its ball element 40, allowing the associated cap element 42 to be lifted out of engagement with the ball element.

The rear ends of the bars 41, 41 are clamped between spaced transverse plate members 51, 52 by means of bolts 53 passing through said plate members and the intervening bars. Clamped to the top plate member 51 over each bar connection is the bottom turn of a conical coiled spring 54. The top end of each spring 54 bears beneath an end portion of the upper transverse plate member 32. Depending rubber bumpers 55, 55 are secured to the end portions of said plate member 32, each bumper 55 being centered within the top end of one of the springs 54, 54.

Secured to the intermediate portion of plate member 51 by means of a vertical bolt 56 and a U-bolt 57 is a laminated rearwardly-extending spring arm 58. Said spring arm may be secured in transverse overlying relation to the plate member 51, as shown in Figures 4 and 5, or alternatively, may be secured transversely between the plate members 51 and 52, as shown in Figures 12 and 13. In the embodiment of Figures 4 and 5, the arms of U-bolt 57 pass through both plate members 51 and 52, spacer sleeves 59, 59 being provided on said arms between the plate members. In the embodiment of Figures 12 and 13, the arms of the U-bolt, shown at 57', pass through the plate members 51 and 52 on opposite sides of the laminated spring arm 58.

Figure 3:
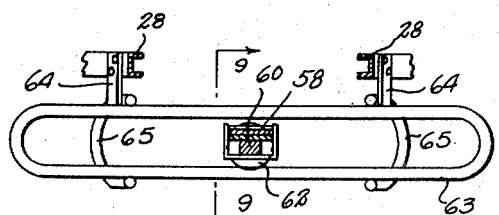
Figure 3 is an enlarged cross-sectional detail view taken on line 3—3 of Figure 2.

Secured to the rear end of the spring arm 58 is a rod member 60 formed with a reduced shaft portion 61 on which is journaled an elongated roller 62. Roller 62 extends through an arcuate track loop 63 secured in horizontal transverse position beneath the trailer hitch arms 28, 28 by respective vertical brackets 64, 64. The brackets 64 are rigidly secured, as by welding, at their lower ends to arcuate brace members 65 carried by the track loop 63. The upper ends of the brackets 64 may be riveted or welded to the respective hitch arms 28, 28. The track loop 63 is preferably fabricated from tubular stock of substantial rigidity. As shown in Figures 3 and 9, the roller 62 bears on the lower arm of the track loop 63 and is biased into engagement therewith by the laminated spring arm 58. When the trailer angles laterally around the pivotal connection provided between ball 35 and ball seat 30, whipping of the trailer is retarded and damped by the frictional resistance of roller 62 as it rotates on the lower arm of the track loop 63.

Under conditions of loading of the trailer which would ordinarily tend to depress the rear end of the automobile chassis 21, load is transmitted to the plate member 51 through springs 54, 54. This load is opposed by a reaction developed in the beam defined by laminated spring arm 58 and the bars 41, 41. This reaction is the result of reactions developed respectively at the ball supports 40 of the bars 41, 41, and at the bottom arm of the track loop 63. The trailer downward load acting on the ball 35 is, therefore, substantially transmitted to the axle housings 22, 22 rather than to the chassis 21. The chassis 21 is, therefore, not depressed at its rear portion by the trailer load and is allowed to ride at substantially its normal angle.

When traveling over rough or bumpy roads, oscillations of the trailer in a longitudinal plane will be cushioned by the springs 54, 54, and by the flexure of the laminated spring arm 58. Said oscillations will, therefore, be damped and will not be transmitted to the automobile chassis. Said chassis, of course, is separated from the wheel axle housings 22, 22 by the usual supporting springs, shown for example at 66.

To disconnect the trailer from the automobile it is merely necessary to disconnect the bars 41, 41 from the ball members 40, 40 and to disconnect the ball seat 30 from the ball element 35, as previously described.

As shown in Figure 1, the curvature of the track loop 63 is substantially centered at the vertical axis passing through the main ball element 35.

While a specific embodiment of an improved trailer hitch structure has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A hitch structure for connecting a trailer to an automobile, comprising a ball member carried by the rear portion of the automobile chassis, a ball seat carried by the trailer tongue, said seat being engageable over said ball member, a beam member pivotally connected to a rear axle housing of the automobile, a transverse support carried by the trailer tongue and underlying the rear end portion of said beam member, and compressible spring means interposed between the forward end of the tongue and said beam member.

2. A hitch structure for connecting a trailer to an automobile, comprising an upstanding ball member secured to the rear portion of the automobile chassis, a ball seat carried at the forward end of the trailer tongue, said seat being engageable over said ball member, a rearwardly-extending beam member pivotally connected to the rear axle housings of the automobile, a transversely-extending track loop carried by the trailer tongue, the rear end portion of said beam member being received in said track loop and being movable laterally therein responsive to lateral angling of the trailer with respect to the automobile, and compressible spring means interposed between the forward end portion of the trailer tongue and said beam member.

3. A hitch structure for connecting a trailer to an automobile, comprising an upstanding ball member secured to the rear portion of the automobile chassis, a ball seat carried at the forward end of the trailer tongue, said seat being engageable over said ball member, rearwardly-converging arms pivotally connected to the respective rear axle housings of the automobile, junction means connecting the rear ends of said arms, a resilient arm secured to said junction means and extending rearwardly therefrom, a depending transversely-extending track loop carried by the intermediate portion of the trailer tongue and receiving the end portion of said resilient arm, said resilient arm being movable laterally in said track loop responsive to lateral angling of the trailer with respect to the automobile, and force-transmitting means interposed between the forward end portion of the trailer tongue and said junction means.

4. A hitch structure for connecting a trailer to an automobile, comprising an upstanding ball member secured to the rear portion of the automobile chassis, a ball seat carried at the forward end of the trailer tongue, said seat being engageable over said ball member, rearwardly-converging arms pivotally connected to the respective rear axle housings of the automobile, junction means connecting the rear ends of said arms, a resilient arm secured to said junction means and extending rearwardly therefrom, a roller journaled on the end of said resilient arm, a depending transversely-extending track loop carried by the intermediate portion of the trailer tongue and receiving said roller, the roller being rotatable laterally in said track loop responsive to lateral angling of the trailer with respect to the automobile, and compressible force-transmitting spring means interposed between the forward end portion of the trailer tongue and said junction means.

5. A hitch structure for connecting a trailer to an automobile comprising a ball member carried by the rear portion of the automobile chassis, a ball seat carried by the trailer tongue, said seat being engageable over said ball member, a beam member pivotally connected to the chassis of the automobile, a support carried by the trailer tongue and underlying said beam member, and compressible spring means interposed between the tongue and said beam member.

6. A hitch structure for connecting a trailer to an automobile, comprising a ball member carried by the rear portion of the automobile chassis, a ball seat carried by the trailer tongue, said seat being engageable over said ball member, a beam member pivotally connected to the chassis of the automobile, a support carried by the trailer tongue and underlying said beam member, and compressible spring means interposed between the tongue and said beam member forwardly of said support.

HAROLD SPITLER.

REFERENCES CITED

The following references are of record in the file of this patent:

UNITED STATES PATENTS

| Number | Name | Date |
| --- | --- | --- |
| 2,238,095 | Almerantz | Apr. 15, 1941 |
| 2,453,941 | Smit | Nov. 16, 1948 |